United States Patent
De Paoli et al.

(10) Patent No.: US 10,576,418 B2
(45) Date of Patent: Mar. 3, 2020

(54) MODULE OF VENTILATION AND BIOLOGICAL PURIFICATION OF INTERNAL AND EXTERNAL AIR TO AN ENVIRONMENT, AND RELEVANT METHOD

(71) Applicant: POLITECNICO DI TORINO, Turin (IT)

(72) Inventors: Orio De Paoli, Turin (IT); Marco Simonetti, Turin (IT); Angelica Morra, Turin (IT); Monica Novara, Turin (IT)

(73) Assignee: POLITECNICO DI TORINO, Turin (IT)

( * ) Notice: Subject to any disclaimer, the term of this patent is extended or adjusted under 35 U.S.C. 154(b) by 0 days.

(21) Appl. No.: 15/759,504

(22) PCT Filed: Aug. 31, 2016

(86) PCT No.: PCT/IB2016/055195
§ 371 (c)(1),
(2) Date: Mar. 12, 2018

(87) PCT Pub. No.: WO2017/042664
PCT Pub. Date: Mar. 16, 2017

(65) Prior Publication Data
US 2019/0111386 A1 Apr. 18, 2019

(30) Foreign Application Priority Data
Sep. 11, 2015 (IT) .............................. UB2015A3572

(51) Int. Cl.
*B01D 53/84* (2006.01)
*F24F 7/00* (2006.01)
*F24F 13/28* (2006.01)

(52) U.S. Cl.
CPC ................ *B01D 53/84* (2013.01); *F24F 7/00* (2013.01); *F24F 13/28* (2013.01); *F24F 2007/003* (2013.01); *F24F 2221/36* (2013.01)

(58) Field of Classification Search
CPC .... A01G 9/24; A01G 9/14; A01G 2009/1492; A01G 9/246; A01G 13/08; A01G 9/00;
(Continued)

(56) References Cited

U.S. PATENT DOCUMENTS 3,299,589 A * 1/1967 Hay .......................... A01G 9/24
52/71
3,474,720 A * 10/1969 Sartain ................... A01G 9/246
454/236
(Continued)

FOREIGN PATENT DOCUMENTS

EP    1 790 914 A2 *  5/2007  ............... A61L 9/00
ES    2 427 722 T3 * 10/2013  ............... A61L 9/00
(Continued)

OTHER PUBLICATIONS

International Search Report for PCT/IB2016/055195 dated Feb. 8, 2017.
Written Opinion of the International Searching Authority dated Feb. 8, 2017.
English Abstract for JP H03-296410 A dated Dec. 27, 1991.

*Primary Examiner* — Timothy C Vanoy
(74) *Attorney, Agent, or Firm* — Hedman & Costigan, P.C.; James V. Costigan; Kathleen A. Costigan

(57) ABSTRACT

The invention relates to a module for ventilation equipped with a biological system for purification of indoor and/or outdoor air of an environment having a box body with a first (2) and a second (4) wall facing each other, and at least one of the first and the second wall comprising a sheet made of a material transparent to light; a pair of sidewalk (6) each one connected to the first (2) and second wall (4) and adapted to close the box body laterally; a base (3) and a lid
(Continued)

(5) each one connected to the pair of sidewalk (6) and to the first (2) and second (4) wall to close the box body at the bottom and at the top respectively; a purification chamber (30) where a biofilter (10) is arranged for purifying an input air flow (A) entering the module (1).

22 Claims, 5 Drawing Sheets

(58) Field of Classification Search
CPC ............... A01G 9/013; A01G 2202/25; A01G 2209/14; A01G 2209/22; F24F 2003/1653; F24F 3/16; F24F 3/1603; F24F 3/1607; F24F 2003/1621; B01D 46/0028; B01D 46/0036; B01D 46/0038; B01D 51/00; B01D 51/10; B01D 2221/16; B01D 2258/06; B01D 2259/4508
See application file for complete search history.

(56) References Cited

U.S. PATENT DOCUMENTS

| | | | |
|---|---|---|---|
| 5,315,834 A * | 5/1994 | Garunts | A61L 9/00 |
| | | | 62/78 |
| 6,006,471 A | 12/1999 | Sun | |
| 6,197,094 B1 | 3/2001 | Thofelt | |
| 8,707,619 B2 | 4/2014 | Edwards | |
| 2008/0254080 A1 * | 10/2008 | Glynson | A61L 2/232 |
| | | | 424/404 |
| 2016/0038873 A1 * | 2/2016 | Matheis | B01D 53/85 |
| | | | 435/3 |
| 2018/0220595 A1 * | 8/2018 | Hancock | A01G 9/24 |

FOREIGN PATENT DOCUMENTS

| | | | | |
|---|---|---|---|---|
| GB | 2 451 423 A | * | 2/2009 | ............... A61L 9/16 |
| GB | 2 451 423 B | * | 7/2010 | ............... A61L 9/16 |
| JP | H03-296410 A | | 12/1991 | |
| WO | WO 2014 202801 A1 | * | 12/2014 | ............... A01G 9/24 |

* cited by examiner

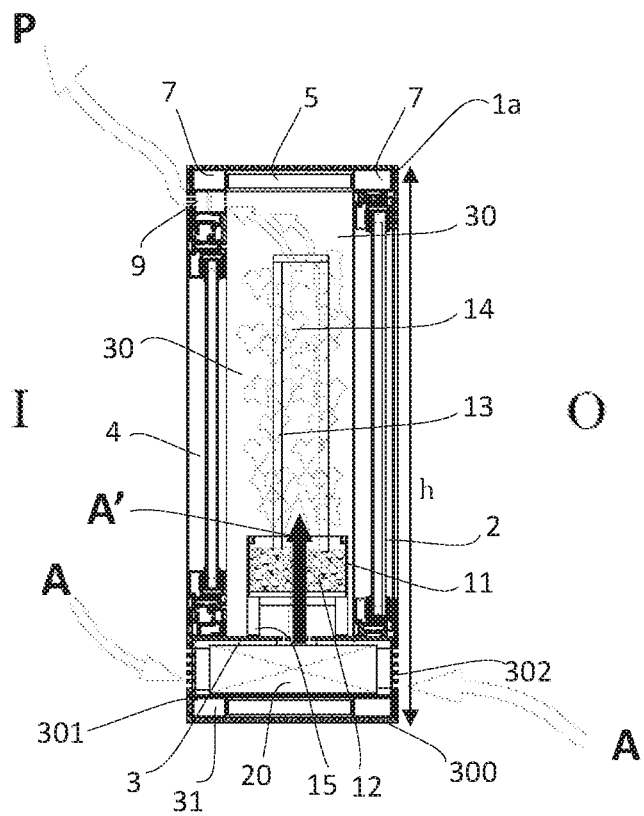
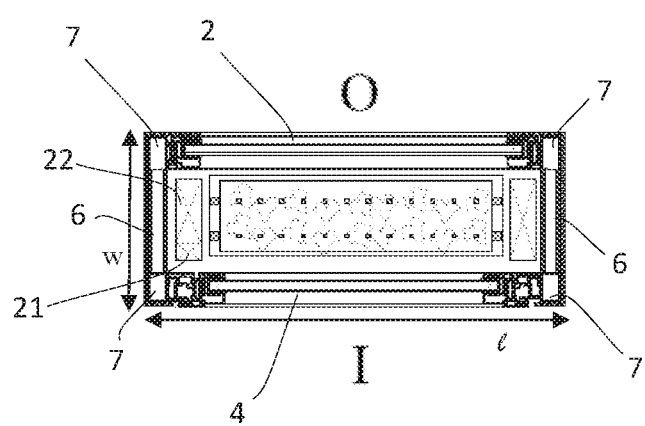
Fig. 3A
Fig. 3B

MODULE OF VENTILATION AND BIOLOGICAL PURIFICATION OF INTERNAL AND EXTERNAL AIR TO AN ENVIRONMENT, AND RELEVANT METHOD

TECHNICAL FIELD

The present invention relates to devices for ventilation and biological purification of air, according to the preamble of claim 1.

The present invention also relates to a method for ventilation of an environment and biological purification of indoor air of the environment and/or outdoor air introduced in such environment.

PRIOR ART

Treatment of air for anthropized environments currently provides many suggestions and already produced systems. Some of the most recent solutions provide to use plant elements, used as a filter for purifying air, placed inside devices for ventilation of environments, where air is caused to flow and then it is introduced again in the same environment as purified air.

For example the U.S. Pat. No. 6,197,094 B1 discloses a device for improving quality of indoor air of an environment, composed of a transparent element containing leaf plants. The air of the environment where the device is placed enters in the top part of the device, is purified from pollutants by absorption by means of the leaves of the plants and then it is introduced again in the same environment as purified air.

Also the U.S. Pat. No. 8,707,619 B2 discloses a device able to filter air in an environment using potentialities of a plant, of its roots and soil as real air filters. This solution provides an housing, partially made of Plexiglas to provide light necessary for plant survival, where it is inserted and provided with an inlet opening for contaminated air, that, once filtered from pollutants by the plant, goes out as purified air from a rear opening. In order to help air to be moved both the openings are provided with a fan.

Although such solutions allow quality of air inside an environment to be improved, by absorbing pollutants contained therein and by purifying it, they have the drawback of recirculating the same air inside the environment where the devices are installed. Therefore although guaranteeing a good efficiency in purifying air from pollutants, the environments characterized with such solutions require elements such to carry out aeration with outdoor environments, such as for instance windows, to avoid forming bacteria or moulds harmful to man and to the building structure, resulting in an increase of energy losses of the building when stale air is released outside.

A further drawback of such solutions is the need of providing, in environments equipped with said devices, an air conditioning system separated therefrom, worsening the air treatment system as regards costs and design complexity and also damaging energy-environmental performances of buildings where they are installed.

OBJECTS AND SUMMARY OF THE INVENTION

It is the object of the present invention to overcome prior art drawbacks.

Particularly the object of the present invention is to provide a module for ventilation and biological purification of air allowing indoor air of an environment to be purified while allowing air introduced in the indoor environment from an outdoor environment to be changed and purified.

It is also an object of the present invention to provide a module for ventilation and biological purification of air optimizing energy-environmental performances of a building.

It is a further object of the present invention to provide a module for ventilation and biological purification of air reducing the design complexity and costs of a system for treating air in buildings.

It is a further object of the present invention to provide a module for ventilation and biological purification of air having characteristics of versatility in use and therefore that can be used both for new buildings and for renovation of already existing buildings.

Moreover it is an object of the present invention to provide a method for the ventilation of an environment and the biological purification of indoor air of an environment and/or outdoor air introduced in such environment through said module, that allows efficiency of air purification to be improved.

Such objects are achieved by the ventilation module equipped with a biological system for purifying indoor air and/or outdoor air of an environment, according to the present invention that provides a box body comprising two walls facing each other, and at least one of the two walls comprising a sheet made of a material transparent to light. The module further comprises: a pair of sidewalls each one connected to the two walls and intended to close said box body laterally; a base and a lid each one connected to the pair of sidewalls and to the two walls to close said box body at the bottom and at the top respectively; a purification chamber where a biofilter is placed for purifying an air flow entering the module; two inlet openings to allow the air flow that has to be purified to enter in the purification chamber and formed in one of the two walls respectively; an outlet opening adapted to allow an air flow purified in the purification chamber to flow out from the module. The module further comprises a heat exchanger arranged such to receive air from the two inlet openings and let an air flow to flow out from the heat exchanger towards the purification chamber.

Such solution allows air to be changed both with inside and outside of the building where the module is installed, and it allows energy losses of the building to be minimized eliminating both thermal losses occurring through windows, and sudden changes of temperature due to letting hot stale air out in winter and cold stale air out in summer, obtaining an efficient aeration of indoor environments of a building.

In addition, the presence of a heat exchanger integrated in the ventilation module, allows air taken from the outdoor environment to be kept at a constant temperature inside the environment where it is introduced. Such solution allows energy-environmental performances of the building to be optimized, it helps in reducing pollutants of outdoor air, and it guarantees a higher thermal-hygrometric comfort of people living therein. Such solution is also simplified and it reduces design costs since it integrates within a single device purification, conditioning and change of air of an environment with heat recovery.

Specifically the above and other objects and advantages of the invention, as disclosed in the description below, are achieved by a method for ventilating an environment and biologically purifying indoor air of the environment and/or outdoor air introduced in such environment, through a module as the one according to claim 1.

Preferred and variant embodiments of the module, of the method and of its applications according to the present invention are the subject matter of the dependent claims.

It is understood that all the annexed claims are an integral part of the present description and each one of the technical characteristics claimed therein is possibly independent and usable autonomously from the other aspects of the invention.

It is immediately clear that many changes can be made to what described (for instance about the shape, dimensions, arrangements and parts with equivalent functionalities) without departing from the scope of protection of the invention as claimed in the annexed claims.

Further advantageous characteristics will be more clear from the following description of preferred but not exclusive embodiments, provided merely by way of example and not as a limitation.

BRIEF DESCRIPTION OF THE DRAWINGS

The present invention will be described below by some preferred embodiments, provided by way of example and not as a limitation, with reference to the annexed drawings. These drawings show different aspects and examples of the present invention and, where appropriate, like structures, components, materials and/or elements in different figures are denoted by like reference numerals.

FIGS. 3A and 3B are a side section view and a top section view of the module according to the invention.

DETAILED DESCRIPTION OF THE INVENTION

While the invention is susceptible of various modifications and alternative forms, some non-limitative embodiments, provided by way of example, are described below in details.

It should be understood, however, that there is no intention to limit the invention to the specific embodiments disclosed, but, on the contrary, the intention of the invention is to cover all modifications, alternative constructions and equivalents falling within the scope of the invention as defined in the claims.

Therefore, in the description below, the use of "for example", "etc", "or" indicates non-exclusive alternatives without limitation unless otherwise defined; the use of "also" means "among which, but not limited to", unless otherwise defined; the use of "include/comprise" means "include/comprise, but not limited to," unless otherwise defined.

References to "upper", "lower", "above", "under" and the like are, unless otherwise defined, to be intended with reference to an operating condition that is with the device in the installed condition.

Figure 1:
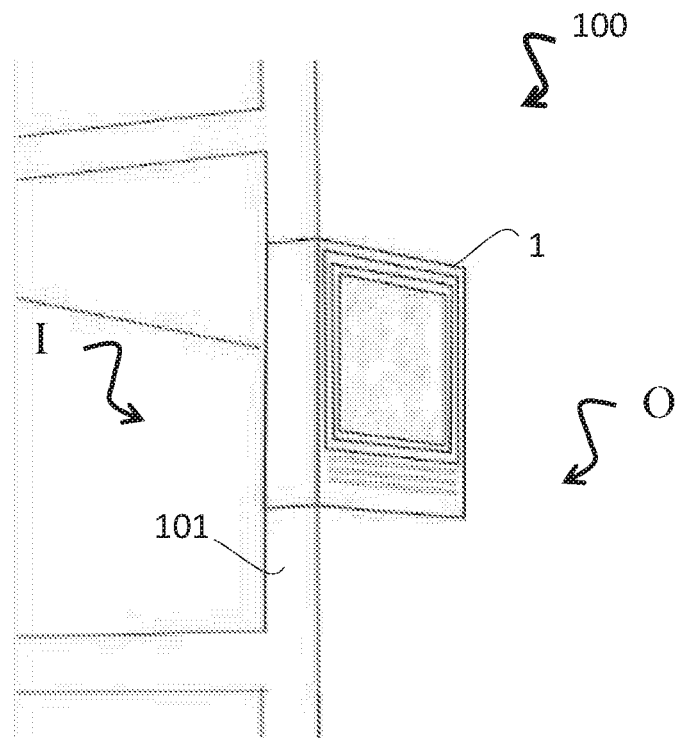
FIG. 1 and FIG. 2 are front views of an application system of a module for ventilation and biological purification of air according to the present invention.

FIG. 1 shows a structure 100 comprising a device 1 according to the invention, for the ventilation and biological purification of indoor and outdoor air of an environment. The device is preferably and advantageously used in structures for residential use, business use, industrial use and in accommodation facilities, both for new constructions and for renovation of existing buildings, and it is particularly suitable for being used in contaminated areas.

In the embodiment shown in FIG. 1 and in a non-limitative manner, the device 1 is fitted into the thickness of a vertical wall 101 of the structure 100, such that with the device in the installed condition, the device defines an indoor environment (I) within the structure 100 and an outdoor environment (O) external to the structure 100.

In the example described herein, and in one preferred embodiment, the vertical wall 101 is a perimetral wall of a building but, in a completely similar manner, the device can be fitted in the thickness of a vertical wall of a building facing a passage put in fluid communication with environmental air.

Figure 2:
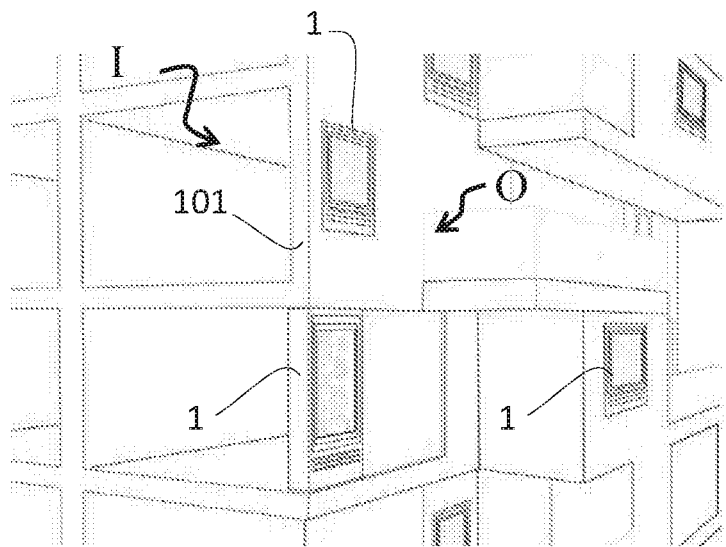

Moreover as seen in FIG. 2, the device is a modular element, since in case of need it is possible to provide to arrange other modular elements 1 of the same type both on the same and on other perimetral walls, for example depending on design constraints of the building or on the amount of pollutants in the area where the building stands, and their operation is independent from each other.

With reference to FIGS. 3A and 3B, the module 1 comprises a box body 1a comprising a first wall 2, a second wall 4, a pair of sidewalls 6, a base 3 and a lid 5, such to define a box structure comprising a purification chamber 30 therein.

In the embodiment shown here, the box body provides a plurality of posts 7 to which the first wall 2 and second wall 4, the sidewalls 6, the base 3 and the lid 5 are fastened, by welding or screw coupling and posts 7 preferably are metal sections.

More in details, the first wall 2 and the second wall 4 are planar elements parallel to each other and they face the outdoor environment (O) and the indoor environment (I) of the structure 100 respectively. Such elements preferably comprise fixed or openable frames, intended to house panels or sheets made of a material transparent to light, for example made of glass, Plexiglas or any other material that allows light to pass inside the module 1.

In a preferred embodiment the frame 2, that one facing the outdoor environment (O), can be fixed or openable and the frame 1, facing the indoor environment (I) is openable, for example by manual commands or by electric actuators, such to have the access inside the module 1.

The pair of sidewalls 6 is intended to close laterally the box body 1a and each one of them is placed at the respective opposite ends of the two frames (2, 4) and is arranged orthogonally thereto. Sidewalls 6 are panels preferably made of opaque material, with insulating properties. The box body 1a is further closed at the bottom by the base 3 and at the top by the lid 5.

In a variant embodiment, at least one of the two sidewalls 6 is equipped with hinges secured to the wall 101, such that the whole module 1 is movable between an opening position where is occupies the indoor environment (I) or the outdoor environment (O) of the structure 100 and a closed position where the module 1 is aligned with the wall 101.

Advantageously the module 1 can be made of different dimensions, that can change depending on needs of installation of the module 1 in the wall 101 of the building.

Thus the module 1 is easily adaptable into apertures already present in the wall or it can be adapted to different design needs of a building.

Preferably the dimensions of the module 1 can change as regards width l ranging from a minimum value of 100 cm to a maximum value of 150 cm, height h ranging from a minimum value of 120 cm to a maximum value of 270 cm and depth to ranging from a minimum value of 40 cm to a maximum value of 100 cm.

The module 1 is further provided with a covering made of varnished sheet metal that is fastened to the first wall 2 and to the second wall 4 by bolted joints and a with a system for fastening into the wall of the building. Particularly the covering is perimetral to the two frames (2,4) such not to cover the sheets made of a material transparent to light.

The base 3 of the box body 1a at the bottom faces a chamber 31, provided with perimetral walls defining a container 300, and wherein a heat exchanger 20 is inserted. The chamber 31 extends for all the width l of the base 3 and the perimetral walls comprise a first face 301 facing the indoor environment (I) and a second face 302 facing the outdoor environment (O).

Figure 4A:
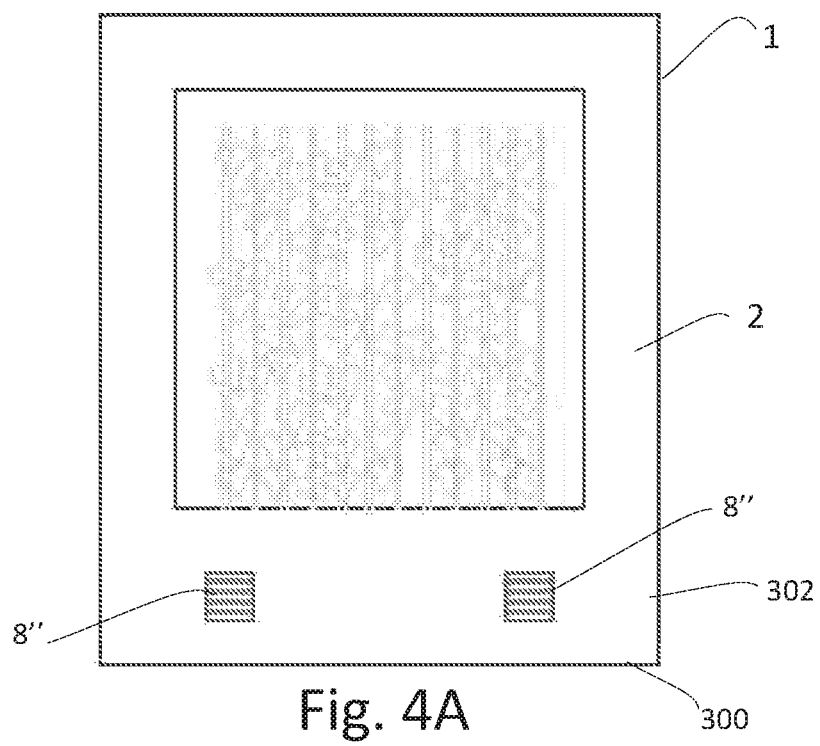
FIGS. 4A and 4B are a view from an indoor environment and a view from an outdoor environment of a structure where the module according to the invention is installed.
Figure 4B:
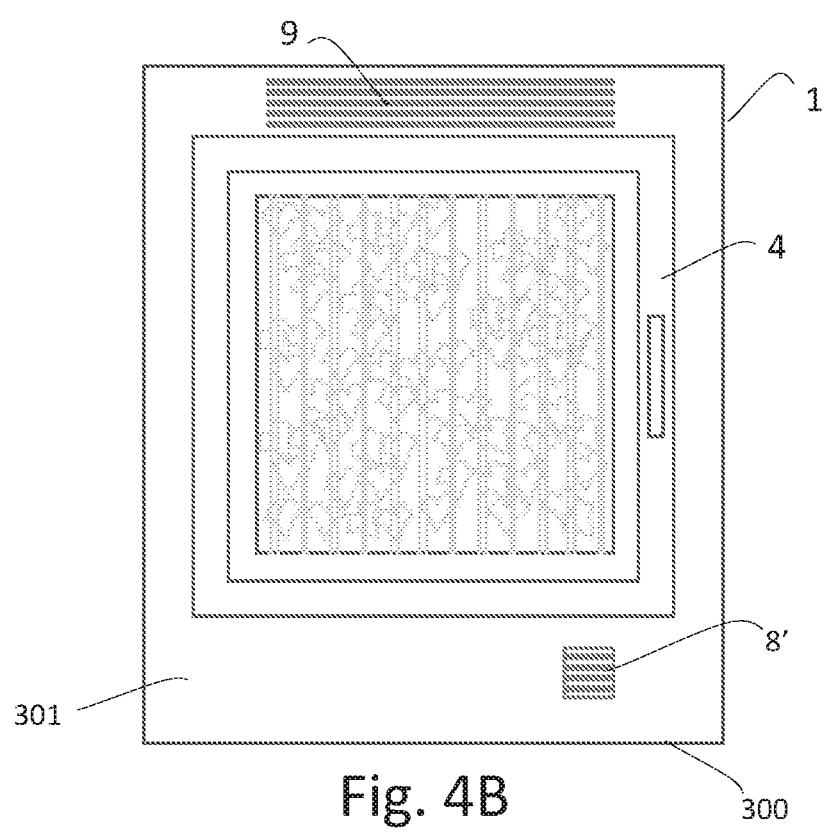

As seen in FIGS. 4A and 4B both the first face 301 and the second face 302 are equipped with at least one opening (8', 8") respectively, that in the embodiment shown in the figure are ports equipped with slits, to allow passage of air flow to be purified, both from the indoor environment (I) (entering from opening 8') and from the outdoor environment (O) (entering from opening 8"), inside the heat exchanger 20.

Preferably the heat exchanger 20 is an exchanger with efficiency greater than 90% and a counter-flow exchanger, and inside the chamber 31 where the exchanger is placed there is provided a system for aspirating air to be purified.

The aspirating system comprises fans to help air flow that has to be purified to be aspirated (denoted in FIGS. 3A and 3B by letter A) and to convey it inside the exchanger 20, and possibly one or more fans to force the output aspirated flow (A') from the exchanger 20 into the purification chamber 30. To this end the base 3 is provided with an opening allowing fluid communication between chamber 31 and purification chamber 30.

In one embodiment the chamber 31 is further provided with a temperature control system. Such system comprises a temperature sensor intended to detect the temperature of the air flow to be purified (A') entering the purification chamber 30, and with one or more by-pass valves placed inside the exchanger 20.

Particularly in the hot season, identified by a temperature value of the indoor environment that can be set from the outside of the module 1, when the flow (A) is at a temperature lower than the indoor temperature, the temperature sensor drives the by-pass valves of the exchanger, that act on the flow rate of the air aspirated from the indoor environment (I) and/or outdoor environment (O), such to allow free-cooling effect of external air to be used.

In a variant embodiment by-pass valves of the heat exchanger 20 allow the flow rate of the air flow (A) that has to be purified to be adjusted depending on different operating parameters, such as for example the flow rate of air detected in the sections of the inlet openings (8', 8").

With reference to FIGS. 3A and 3B, inside the purification chamber 30 there is provided a biofilter 10 comprising a container 11, resting on a support 15 fastened to the base 3, and containing a substrate 12. The substrate preferably is active soil containing microorganisms intended to absorb and metabolize pollutants present in the air flow (A') to be purified and wherein one or more supports 13 are fitted to support one or more species of plants 14.

The container 11 is removable in case of maintenance and replacement of plants and/or substrate and an external user has the access thereto when the frame 2 is opened. Preferably the surface of the container 11 resting on the support 15 is perforated, such that the air flow to be purified (A') entering the purification chamber 30 and coming from the heat exchanger 20 can reach the plants 14 after passing the substrate 12.

Plants 14 preferably are species of leaf plants selected in the list comprising Acanthacee, Agavaceae, Anthericaceae, Araceae, Araliaceae, Asclepiadaceae, Bromeliaceae, Commelinaceae, Spurge, Geraniaceae, Liliaceae, Marantaceae, Moraceae, Palmae, Piperaceae, whose leaves act for capturing particles of pollutants contained in the air flow (A') flowing therethrough.

The purification chamber 30 is further provided with a system extracting a purified air flow (P) from the biofilter 10 comprising a fan, placed at an outlet opening 9, intended to allow the air flow (P) purified into the purification chamber 30 to flow out from the module.

In the shown example the opening 9 is obtained on the wall 4 of the box body 1a, but in a completely similar manner, variant embodiments can provide the outlet opening 9 on the sidewalls 6 or on the lid 5. The purified air flow (P) therefore passes through the outlet opening 9, and by means of suitable channels not shown in the figures, it is conveyed in the indoor environment (I) in the structure 100.

The module 1 further provides an irrigation system for plants 14 contained in the purification chamber 30. The irrigation system is intended both to feed plants and to clean them from pollutants they capture on the leaves. It is preferably an automatic rain irrigation system, with nozzles fastened on the top of the purification chamber 30 and comprises a pump 21 taking water from a storage tank 22 to feed nozzles.

In a preferred embodiment the storage tank 22 is equipped with a sensor to monitor the water level contained therein connected to a warning light and/or audible alarm that warns a user when the water level is lower or higher than a range of operating values. The storage tank 22 is further provided with a door accessible from the outside of the module 1 to facilitate refilling of water.

In a variant embodiment in order to obtain water supply, the module 1 is provided with at least one opening for the connection to a charging duct in communication with the water supply system of the structure where it is installed, and it further provides regulating valves allowing water supply to the irrigation system to be regulated.

Preferably inside the purification chamber 30 and under the container 11, there is provided a rain water head for collecting washing water that, through suitable channels (not shown in figures), conveys waste water or excess water present in the chamber 30 in the gutter system or in discharge pipes of the building wherein the module 1 is installed In order to promote the development of plant species contained in the purification chamber 30 and to allow the proper light amount for them also in case of no natural light, the module 1 provides a lighting control system. Such system in presence of natural light allows the amount of sun light to be regulated for example by automatized systems of shutters or darkening panels partially covering the sheets of transparent material.

In case of no natural light, the lighting control system provides inside the module the presence of solar spectrum sources, whose luminous intensity is manually or automatically adjustable, for example by home-automation systems, and that further act for environmental lighting aesthetical effect.

An independent aspect autonomously usable from the other aspects of the invention provides a ventilation system for an environment delimited by a floor, a ceiling and perimetral walls connecting the floor to the ceiling, through a ventilation and purification module just described.

Figure 5:
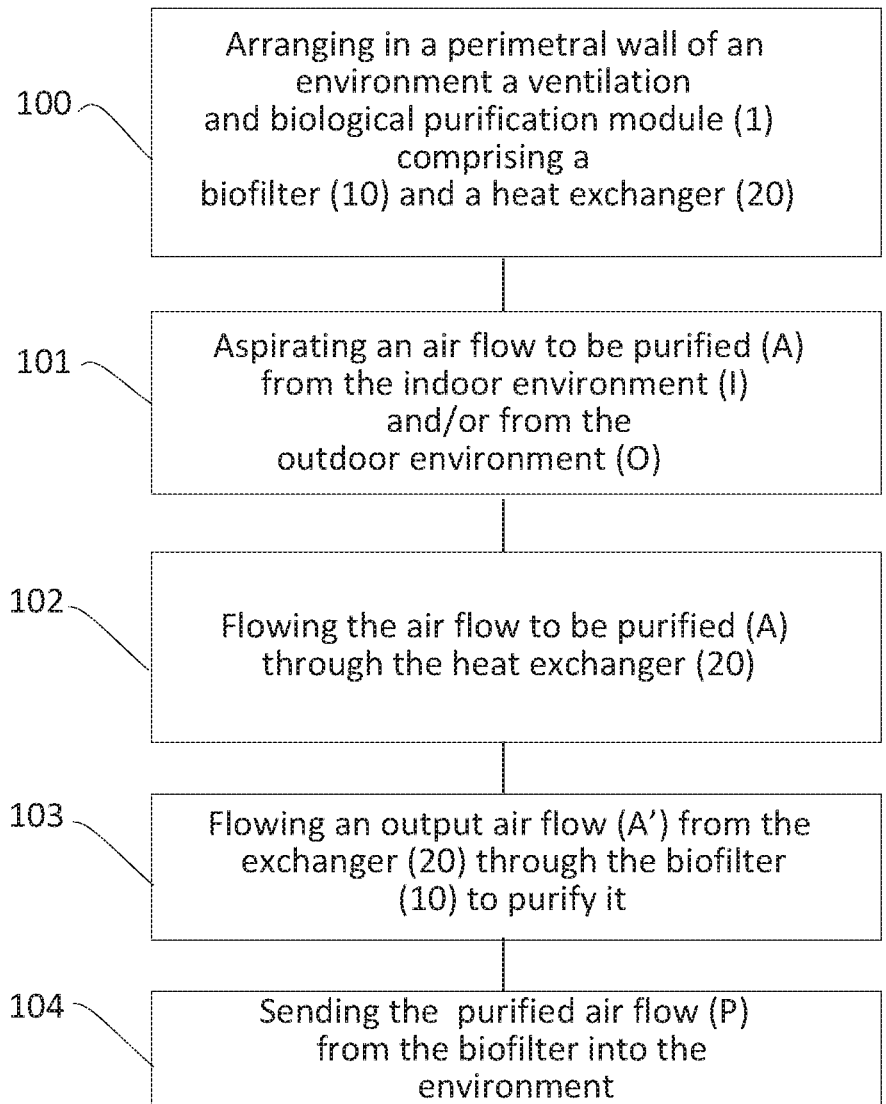
FIG. 5 is a flow diagram showing the steps of the method for ventilating an environment and for biologically purifying air according to the present invention.

According to the preferred embodiment shown in FIG. 5 the method provides firstly (step 100) to arrange in a perimetral wall of an environment of the structure 100, the module 1 for ventilation and biological purification of an air flow (A), equipped with the biofilter 10 and the heat exchanger 20.

Then the method provides to aspirate (step 101) the air flow to be purified (A) from indoor (I) and/or outdoor (O) environment, through inlet openings (8',8").

Then the method provides to cause (step 102) the aspirated air flow (A) to flow through the heat exchanger (20). In this step, the air flow coming from the outdoor environment (O) and the air flow coming the indoor environment (I), as known, exchange thermal energy through the exchanger 20, such to make the thermodynamic properties of the output flow (A') from the exchanger 20 and entering the purification chamber 30 of the module 1 as uniform.

Such step is performed such that the air flow (A') to be purified has a flow rate variable from 100 m$^3$/h to 300 m$^3$/h, preferably equal to 200 m$^3$/h.

Therefore the air flow (A') is caused to flow (step 103) through the biofilter 10 such that firstly the microorganisms present in the substrate 12 and then the leaves of the plant 14, capture pollutants present in the air flow to be purified (A').

Particularly the biofilter is intended to reduce pollutants comprised in the list comprising sulphur oxide, nitrogen oxide, VOC, IPA, $O_3$, CO, $CO_2$, PM10 and PM2,5. The air flow (P) purified by the biofilter 10 therefore is then taken (step 104) from the module 1 through the outlet opening 9 and it is introduced in the indoor environment (I).

This method allows efficiency of air purification to be obtained, expressed as percentage of removal of pollutants, variable from 20% to 80% and preferably equal to 70%.

Therefore from the description above it is clear how the ventilation module equipped with a biological system for purifying indoor and/or outdoor air of an environment and the relevant method for ventilating and biologically purifying air introduced in such environment, allows the above objects to be achieved.

It is also clear, for a person skilled in the art, that it is possible to make changes and further variants to the solution described, without for this reason departing from the teaching of the present invention, and from the scope of protection as defined in the annexed claims.

For example in a solution, the module can comprise only one transparent sheet for letting light in which is necessary for the survival of the plant used as biofilter. Such a solution may for instance be used in buildings where the module does not serve as an entrance for light in the building, but only as an air purification element; in this case the module is mounted with the transparent sheet facing the outside of the building.

Figure 4C:
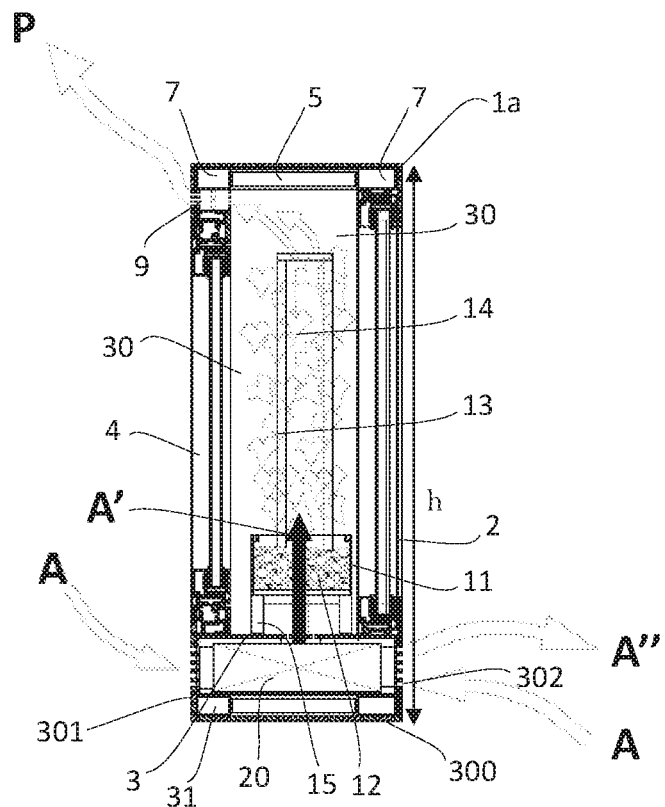
FIGS. 4C and 4D are a side section view and a top section view of a variant embodiment of the module according to the invention.
Figure 4D:
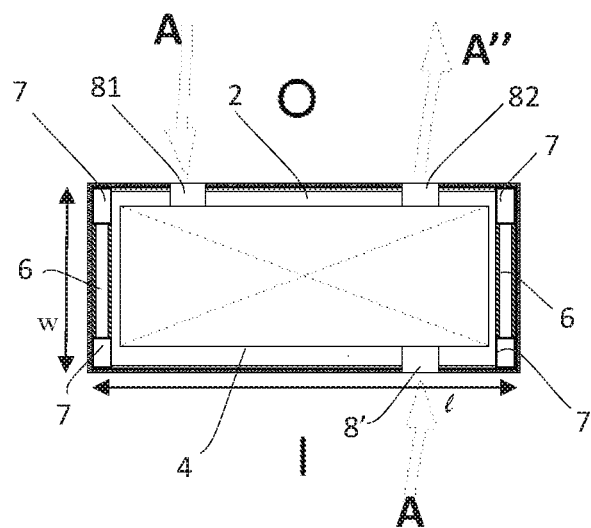

In one embodiment, shown in FIGS. 4C and 4D, the module 1 is provided on the wall 2 facing the outdoor environment (O), with an inlet opening 81 intended to allow an air flow to enter from the outdoor environment (O) in the heat exchanger 20 and with an outlet opening 82 intended to allow an air flow from the heat exchanger 20 to flow out towards the outdoor environment (O) of the structure 100.

The outlet opening 82 preferably is formed at the chamber 31 housing the heat exchanger 20. The opening 82 is further provided with an adjustment element that allows the passage of air flow passing therethrough to be controlled, such as for instance a grid provided with movable louvers driven by a user by means of a slider accessible from the outside of the module 1.

Such arrangement allows the air flow from the exchanger to be split: a first air flow (A') entering the purification chamber (30) and a second air flow (A") flowing towards the outdoor environment (O) external to the module through the outlet opening 82.

Thus it is possible to operate a further adjustment of the temperature of air to be purified, by reducing or increasing, by the adjustment element, the flow rate of the air flow (A') entering the purification chamber 30.

Such type of adjustment is applied mainly in winter seasons and summer seasons, when due to high sudden changes of temperature between air of the indoor environment (O) and air of the outdoor environment (O), air flow (A') would have a temperature not suitable both for the biofilter 10 and, once purified and introduced in the indoor environment (I), for people therein.

In addition, such arrangement allows the indoor environment (I) to be aerated, since it allows the adjustment of the flow rate of the stale air flow drawn therefrom and to be exhausted outside the structure through the outlet opening 82.

The invention claimed is:

1. Module (1) for ventilation and biological purification of indoor and outdoor air of an environment comprising:
   a box body comprising
      a first (2) and a second (4) wall facing each other, at least one of said first and said second walls comprising a sheet made of a material transparent to light,
      a pair of sidewalls (6) each one connected to said first (2) and second (4) walls and suitable for closing said box body laterally,
      a base (3) and a lid (5) each one connected to the pair of sidewalls (6) and to the first (2) and second (4) walls to close said box body at the bottom and at the top respectively,
      a purification chamber (30) where a biofilter (10) is arranged for purifying an input air flow (A) entering the module (1),
      two inlet openings (8', 8") suitable for allowing the air flow that has to be purified to enter in the purification chamber (30), each one of said openings (8', 8") being formed in one of the first (2) and second (4) walls respectively,
      an outlet opening (9) suitable for allowing a purified air flow (P) to flow out from the module into the purification chamber (30),
   characterized in that it comprises:
      a heat exchanger (20) arranged so as to receive air from the two inlet openings (8', 8") and let an air flow to flow out from the heat exchanger towards the purification chamber.

2. Module (1) according to claim 1, wherein the heat exchanger (20) is a counter-flow heat exchanger.

3. Module (1) according to claim 2, wherein the heat exchanger (20) is a heat exchanger with efficiency greater than 90%.

4. Module (1) according to claim 1, wherein at least one of the two walls (2,4) is movable between a closed position that does not allow the purification chamber (30) to be accessed from the outside of the module (1) and an open position that allows the purification chamber (30) to be accessed.

5. Module (1) according to claim 1, wherein the purification chamber (30) further comprises an irrigation system comprising
a pump (21) connected to a storage tank (22) for drawing water from the storage tank and send it to nozzles located above the purification chamber (30);
a system for the collection of waste water and/or excess water;
a discharge pipe connected to the system for the collection of waste water and/or excess water and suitable to be connected to the discharge system of a building where the module (1) is installed.

6. Module (1) according to claim 5, wherein the purification chamber (30) further comprises an irrigation system comprising
at least one opening for the connection to a charging duct of a water supply system of a building where the module (1) is installed;
a regulating valve for regulating the inflow of input water to the irrigation system from the charging duct.

7. Module (1) according to claim 6, wherein the irrigation system further comprises
a sensor to monitor the water level inside the storage tank (22) and
an alarm system connected to the sensor and adapted to emit an alarm signal when the sensor detects a water level lower than a threshold value.

8. Module (1) according to claim 1, further comprising a system for aspirating the air flow to be purified and/or a system for taking out the purified air flow.

9. Module (1) according to claim 1, wherein said biofilter (10) comprises a container (11) containing a substrate (12), wherein the container (11) is opened in a region suitable for receiving the growth of plants planted in the substrate and it comprises at least one perforated wall to allow the air flow that has to be purified to pass inside it towards the substrate.

10. Module (1) according to claim 1, further comprising a manual or automatic lighting system to illuminate the purification chamber.

11. Module (1) according to claim 1, wherein the biofilter comprises plants (14) selected from Acanthacee, Agavaceae, Anthericaceae, Araceae, Araliaceae, Asclepiadaceae, Bromeliaceae, Commelinaceae, Spurge, Geraniaceae, Liliaceae, Marantaceae, Moraceae, Palmae, Piperaceae.

12. Module (1) according to claim 1, wherein the heat exchanger has a first outlet in fluid communication with the purification chamber (30) and a second outlet (82) in fluid communication with an environment external to the module.

13. Module (1) according to claim 1, wherein the heat exchanger comprises a plurality of by-pass valves adapted to regulate the flow rate of air aspirated from the two inlet openings.

14. Module (1) according to claim 13, further comprising a temperature sensor suitable for detecting the temperature of the air flow to be purified (A') entering the purification chamber (30), and operatively connected to said by-pass valves in such a way to selectively regulate the flow rate of air aspirated from the two inlet openings depending on the detected temperature.

15. Module (1) according to claim 14, wherein
the heat exchanger (20) has a first outlet in fluid communication with the purification chamber and a second outlet (82) in fluid communication with an environment external to the module
wherein the heat exchanger (20) comprises an output by-pass valve adapted to regulate the flow rate of an air flow in said second outlet, and
wherein the temperature sensor is suitable for controlling the output by-pass valve.

16. Method for ventilating an environment delimited by a floor, a ceiling and perimetrical walls that connect the floor to the ceiling, comprising the following steps:
a. arranging in a perimetrical wall of the environment a module (1) for ventilation and biological purification of an air flow (A) comprising a biofilter (10) and a heat exchanger (20) (step 100);
b. aspirating an air flow to be purified (A) from indoor environment (I) and from outdoor environment (O) (step 101);
c. flowing said air flow to be purified (A) through said heat exchanger (20) to form an output air flow (A') (step 102);
d. flowing said output air flow (A') from said heat exchanger (20) through said biofilter (10) to purify said output air flow (A') from pollutants to form a purified air flow (P) (step 103); and
e. sending said purified air flow (P) from the biofilter into the environment (step 104).

17. Method according to claim 16, wherein the air flow to be purified (A) is aspirated from the indoor environment (I), wherein the heat exchanger (20) is a counter-flow heat exchanger and wherein the method provides to:
aspire a second air flow from the outdoor environment (O), and
flow the air flow to be purified and the second air flow through the heat exchanger (20).

18. Method according to claim 16, wherein said output air flow (A') from the heat exchanger (20) has a flow rate variable from 100 m$^3$/h to 300 m$^3$/h.

19. Method according to claim 16, wherein the pollutants are comprised in the list comprising sulfur oxide, nitrogen oxide, VOC, IPA, $O_3$, CO, $CO_2$, PM10, PM2,5.

20. Method according to claim 16, wherein the efficiency in purifying air, expressed as a percentage of removal of said pollutants, is variable from 20% to 80%.

21. Method according to claim 16, wherein said output air flow (A') from the heat exchanger (20) has a flow rate equal to 200 m$^3$/h.

22. Method according to claim 16, wherein the efficiency in purifying air, expressed as a percentage of removal of said pollutants, is equal to 70%.

* * * * *